(12) United States Patent
Shira

(10) Patent No.: US 6,454,666 B1
(45) Date of Patent: Sep. 24, 2002

(54) METHOD OF MAKING A GOLF BALL AND THE GOLF BALL PRODUCED

(75) Inventor: Chester S. Shira, San Diego, CA (US)

(73) Assignee: Carbite, Inc., San Diego, CA (US)

( * ) Notice: Subject to any disclaimer, the term of this patent is extended or adjusted under 35 U.S.C. 154(b) by 0 days.

(21) Appl. No.: 09/607,440

(22) Filed: Jun. 29, 2000

(51) Int. Cl.[7] .............................................. A63B 37/06
(52) U.S. Cl. ...................................................... 473/377
(58) Field of Search ................................ 473/351, 376, 473/377, 378, 371; 156/146

(56) References Cited

U.S. PATENT DOCUMENTS

| | | | |
|---|---|---|---|
| 2,259,060 A | 10/1941 | Brown | 273/62 |
| 2,741,480 A | 4/1956 | Smith | 273/227 |
| 5,497,996 A | 3/1996 | Cadorniga | 273/226 |
| 5,589,546 A | * 12/1996 | Hiraoka et al. | 525/193 |
| 5,833,553 A | * 11/1998 | Sullivan et al. | 473/374 |
| 6,135,899 A | * 10/2000 | Maruko | 473/376 |
| 6,203,451 B1 | * 3/2001 | Rajagopalan | 473/371 |

* cited by examiner

Primary Examiner—Mark S. Graham
Assistant Examiner—Raeann Gorden
(74) Attorney, Agent, or Firm—John L. Gray

(57) ABSTRACT

A method of making a golf ball cover which, in order to increase the golf ball cover density, comprises adding to the cover materials which are in pelletized form nano-particles of a denser material of approximately 0.05 microns or less in size and the golf ball thus produced.

10 Claims, 1 Drawing Sheet

METHOD OF MAKING A GOLF BALL AND THE GOLF BALL PRODUCED

BACKGROUND OF THE INVENTION to In applicant's co-pending application Ser. No. 09/385,532 entitled UNIFORMLY WEIGHTED GOLF BALL, the problem of the core of the golf ball having a different density than the cover of the golf ball is discussed and the erratic behavior of golf balls that do not have the core properly centered when the density of the core and cover is different is set forth. The invention set forth in that application involves making the density of the core and the density of the one or more layers surrounding the core essentially identical. In producing such a ball, there are difficulties encountered in adding heavy additives to the cover in order to have its density the same as that of the core.

The raw materials of the covers are generally provided by the manufacturer in pelletized form. The pellets are then blended with other additives and extruded into the ball molds. Because of the adhesive nature of the cover blends at higher temperature, the blends are heated and melted only just before injection into the mold. This prevents perfect and homogeneous blending of the cover materials with additive particles larger than 0.05 microns since bonding to the pellets is very weak if at all and separation can occur during feeding into the mold.

BRIEF SUMMARY OF THE INVENTION

The present invention provides a method to perfectly blend cover materials and preclude separation during the feeding and heating phases of injection molding of golf ball covers. Prior methods have utilized discreet particles with sizes ranging from approximately 0.5–100 microns in size. These particles do not cling or adhere to the pellets and thus, blending the very large pellets with discreet particles larger than 1 micron is nearly impossible. Applicant's invention utilizes nano-particles which are approximately 0.05 or less in diameter. Because of their very small size, these small particles cling to the pellets and thus, uniformly cover the entire pellet. The particles do not separate during the heating and extrusion processes and thus provide for a very uniform distribution of the nano-particles in the blended cover material.

It is therefore, a object of this invention to provide a method of making a golf ball cover which comprises adding to the cover materials which are in pelletized form nano particles of denser materials of approximately 0.05 micron or less in size.

It is a further object of this invention to provide a golf ball comprising a spherical core and one or more layers of materials wherein the materials have had nano particles of 0.05 micron or less in size added thereto and wherein the density of the core and the one or more layers of materials are essentially the same. These together with other objects of the invention will become apparent from the following drawings and detailed description of the invention.

DETAILED DESCRIPTION OF THE INVENTION

The present invention involves adding materials to a cover material for a golf ball to increase the density of the cover material so that it is approximately equal to the density of the core material to achieve the advantages set forth in applicant's co-pending patent application Ser. No. 09/385,532 entitled UNIFORMLY WEIGHTED GOLF BALL.

Figure 1:
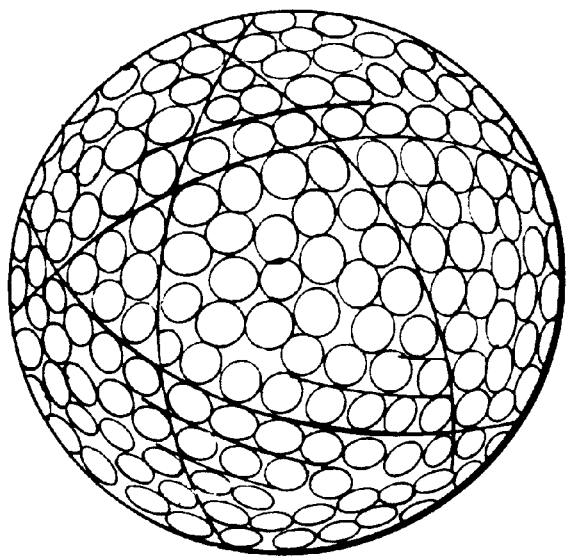
FIG. 1 is a view of a typical golf ball.
Figure 2:
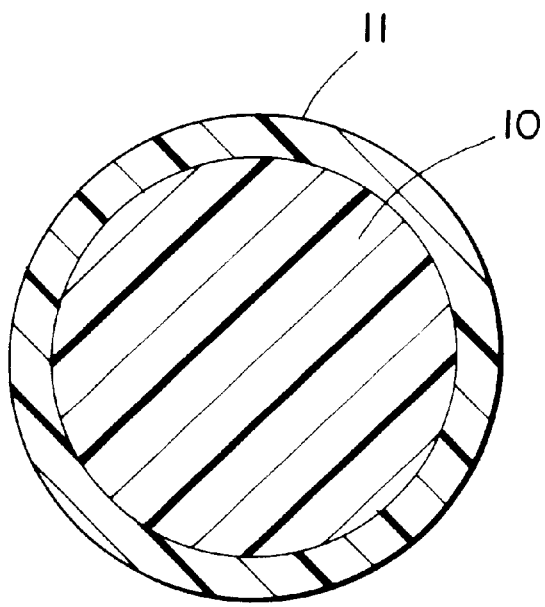
FIG. 2 is a section of said golf ball.

FIG. 1 shows a golf ball thus produced and FIG. 2 shows a section of FIG. 1 wherein 10 is the core and 11 is the cover material which has been made in accordance with the method of this invention.

The particles chosen to increase the density of the cover material are approximately 0.05 microns or less in size. When such materials are added to the pelletized materials, and heated and melted just before injection into the mold these particles cling to the pellets and thus uniformly cover the entire pellet and thus provide for a very uniform distribution in the blended cover material. It is preferred that these particles for creating a higher density cover material are of a density that requires less than a 10% addition by volume to the cover material. Higher volume contents degrade the desired properties of elasticity, elongation and high strength.

EXAMPLE I

Nano-particles of hafnium oxide and tungsten, the size of approximately 0.05 microns feature a density of 12 grams per cc. Less than 2% by volume of such materials are needed to raise the density of the cover material from 0.99 grams/cc to 1.13 grams/cc.

This preferred limitation of 10% has been found to be effective for the purpose of increasing the density without measurable degradation of the desired mechanical properties. These particles are also an off-white color which minimizes reduction of the desired "whiteness" of preferred ball covers.

The desired range of densities for the nano-particles to be added to the cover pellets is from 2.5–22.65 grams per cc.

While a preferred material is a composite nano-particle of approximately 0.05 microns composed of hafnium oxide and tungsten which has a density of 12 grams per cc, other preferred materials include the metals or oxides of tantalum, tungsten, rhenium, osmium and iridium.

While this invention has been shown and described with respect to a detailed embodiment thereof, it will be understood by those skilled in the art that various changes in form and detail thereof may be made without departing from the scope of the claims of the invention.

What is claimed is:

1. A method of making a golf ball cover which comprises providing cover materials in pelletized form adding to the cover materials, nano-particles of denser materials of approximately 0.05 micron or less in size to form a mixture, such that said nano particles cling to said pellets and thus uniformly cover said entire individual pellets to provide a uniform distribution in said cover material, and thereafter heating and injection molding said mixture into a suitable golf ball mold.

2. The method of claim 1 wherein said nano-particles are of a sufficient density so that less than 10% by volume are required when mixed with said cover materials to achieve the desired density of the finished cover.

3. The method of claim 1 wherein said nano-particles consist of a mixture of hafnium oxide and tungsten.

4. The method of claim 1 wherein said nano-particles include a material selected from the group consisting of tantalum, tungsten, rhenium, osmium, iridium and their oxides.

5. A golf ball comprising:

a spherical core, one or more cover layers initially provided in pelletized form material completely covering said core; wherein said cover material, contains density altering constituents which have been added to said cover material in the form of nano-particles of approximately 0.05 micron or less in size so that the density of said cover material is essentially identical to the density of said core, and wherein said nano particles cling to said pellets and thus uniformly cover said entire individual pellets to provide for a very uniform distribution in said cover material.

6. The golf ball of claim 5 wherein said nano-particles are of a sufficient density so that less than 10% by volume are required when mixed with said cover material to achieve the desired density of the finished cover material.

7. The golf ball of claim 5 wherein said nano-particles consist of a mixture of halfnium oxide and tungsten.

8. The golf ball of claim 5 wherein said nano-particles include a material selected from the group consisting of tantalum, tungsten, rhenium, osmium, iridium and their oxides.

9. A method of making a golf ball cover which comprises providing cover materials in pelletized form, adding to the cover materials a mixture of hafnium oxide and tungsten wherein said hafnium oxide and tungsten have a density of approximately 12 grams per cubic centimeter and are in the form of nano particles of approximately 0.05 micron or less in size, to form a mixture, and thereafter heating and injection molding said mixture into a suitable golf ball mold.

10. A golf ball comprising:

a spherical core, one or more layers of material completely covering said core wherein said material contains density altering constituents which have been added to said material in the form of nano particles consisting of hafnium oxide and tungsten wherein said hafnium oxide and tungsten have a density of approximately 12 grams per cubic centimeter and are approximately 0.05 micron or less in size so that the density of said material is essentially identical to the density of said core.

* * * * *